(12) United States Patent
Agrawal et al.

(10) Patent No.: US 11,769,048 B2
(45) Date of Patent: Sep. 26, 2023

(54) RECOMMENDING EDGES VIA IMPORTANCE AWARE MACHINE LEARNED MODEL

(71) Applicant: Microsoft Technology Licensing, LLC, Redmond, WA (US)

(72) Inventors: Parag Agrawal, Mountain View, CA (US); Ankan Saha, San Francisco, CA (US); Yafei Wang, Sunnyvale, CA (US); Yan Wang, Sunnyvale, CA (US); Eric Lawrence, Sausalito, CA (US); Ashwin Narasimha Murthy, Cupertino, CA (US); Aastha Nigam, Sunnyvale, CA (US); Bohong Zhao, San Jose, CA (US); Albert Lingfeng Cui, San Francisco, CA (US); David Sung, Sunnyvale, CA (US); Aastha Jain, Sunnyvale, CA (US); Abdulla Mohammad Al-Qawasmeh, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 437 days.

(21) Appl. No.: 17/021,779

(22) Filed: Sep. 15, 2020

(65) Prior Publication Data
US 2022/0083853 A1   Mar. 17, 2022

(51) Int. Cl.
*G06N 3/08*     (2023.01)
*G06N 3/04*     (2023.01)
*G06F 18/214*   (2023.01)

(52) U.S. Cl.
CPC .......... *G06N 3/08* (2013.01); *G06F 18/2148* (2023.01); *G06N 3/04* (2013.01)

(58) Field of Classification Search
CPC ......... G06N 3/08; G06N 3/04; G06F 18/2148
See application file for complete search history.

(56) References Cited

U.S. PATENT DOCUMENTS

| 8,892,651 | B1 * | 11/2014 | Goldman | G06F 16/9024 |
| | | | | 707/706 |
| 10,311,085 | B2 * | 6/2019 | Rezaei | G06Q 30/0256 |
| 10,331,702 | B2 * | 6/2019 | Bilimoria | G06Q 50/01 |

(Continued)

OTHER PUBLICATIONS

Zhang et al. ("Recommendation over a Heterogeneous Social Network", 2008) (Year: 2008).*

(Continued)

*Primary Examiner* — Michael J Huntley
*Assistant Examiner* — Huma Waseem
(74) *Attorney, Agent, or Firm* — Schwegman, Lundberg & Woessner, P.A.

(57) ABSTRACT

In an example embodiment, a single machine learned model that allows for ranking of entities across all of the different combinations of node types and edge types is provided. The solution calibrates the scores from Edge-FPR models to a single scale. Additionally, the solution may utilize a per-edge type multiplicative factor dictated by the true importance of an edge type, which is learned through a counterfactual experimentation process. The solution may additionally optimize on a single, common downstream metric, specifically downstream interactions that can be compared against each other across all combinations of node types and edge types.

22 Claims, 7 Drawing Sheets

(56) References Cited

U.S. PATENT DOCUMENTS

| | | | | |
|---|---|---|---|---|
| 10,684,738 | B1* | 6/2020 | Sicora | G06F 16/435 |
| 10,757,201 | B2* | 8/2020 | Helvik | G06Q 10/10 |
| 11,245,785 | B2* | 2/2022 | Shuttleworth | G06F 3/0481 |
| 11,328,796 | B1* | 5/2022 | Jain | G16H 10/20 |
| 11,461,216 | B1* | 10/2022 | Jain | G06F 11/3438 |
| 2013/0212229 | A1* | 8/2013 | Vastardis | G06F 15/17306 |
| | | | | 709/219 |
| 2013/0325779 | A1* | 12/2013 | Shahshahani | G06N 5/00 |
| | | | | 706/46 |
| 2016/0099863 | A1* | 4/2016 | Messinger | H04L 41/147 |
| | | | | 370/218 |
| 2016/0188702 | A1* | 6/2016 | Lee-Goldman | G06F 16/3322 |
| | | | | 707/749 |
| 2016/0224562 | A1* | 8/2016 | Tiwari | G06F 16/9024 |
| 2017/0235812 | A1* | 8/2017 | Gong | G06F 16/285 |
| | | | | 707/737 |
| 2017/0337250 | A1* | 11/2017 | Li | G06Q 10/101 |
| 2018/0013818 | A1* | 1/2018 | Howard | H04L 67/535 |
| 2018/0039647 | A1* | 2/2018 | Winstanley | G06F 16/9535 |
| 2018/0349485 | A1* | 12/2018 | Carlisle | G06F 16/9535 |
| 2019/0050945 | A1* | 2/2019 | Ash | G06F 16/435 |
| 2019/0258722 | A1* | 8/2019 | Guo | G06F 16/9024 |
| 2020/0342006 | A1* | 10/2020 | Rossi | G06F 16/285 |
| 2021/0174958 | A1* | 6/2021 | Drake | G06N 20/10 |
| 2021/0201198 | A1* | 7/2021 | Li | G06N 5/022 |

OTHER PUBLICATIONS

Perez-Cervantes et al. ("Using Link Prediction to Estimate the Collaborative Influence of Researchers", 2013) (Year: 2013).*

Fan et al. ("Graph Neural Networks for Social Recommendation", May 2019) (Year: 2019).*

"Quantile", Retrieved from: https://en.wikipedia.org/wiki/Quantile, Retrieved Date: Jul. 6, 2020, 7 Pages.

* cited by examiner

RECOMMENDING EDGES VIA IMPORTANCE AWARE MACHINE LEARNED MODEL

TECHNICAL FIELD

The present disclosure generally relates to technical problems encountered in machine learning. More specifically, the present disclosure relates to recommending edges via an importance-aware machine learned model.

BACKGROUND

The rise of the Internet has occasioned two disparate yet related phenomena: the increase in the presence of online networks, with their corresponding user profiles visible to large numbers of people, and the increase in the use of these online networks to provide content. Online networks generally provide users with the ability to create a user profile and then to connect their user profile to other user profiles (a process commonly referred to as "linking" or "friending"). The connections between users may be used to form a social network graph, with users represented by nodes in the graph and the connections between users represented by edges between the nodes.

The social network graph may be used to recommend other users that a user may be interested in connecting with. There may be instances, however, where it would be helpful to be able to recommend other types of entities in an online network, other than just users. For example, a social networking service may wish to recommend companies or hashtags that a user may be interested in following, or newsletters, groups, or events that a user may be interested in subscribing to.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
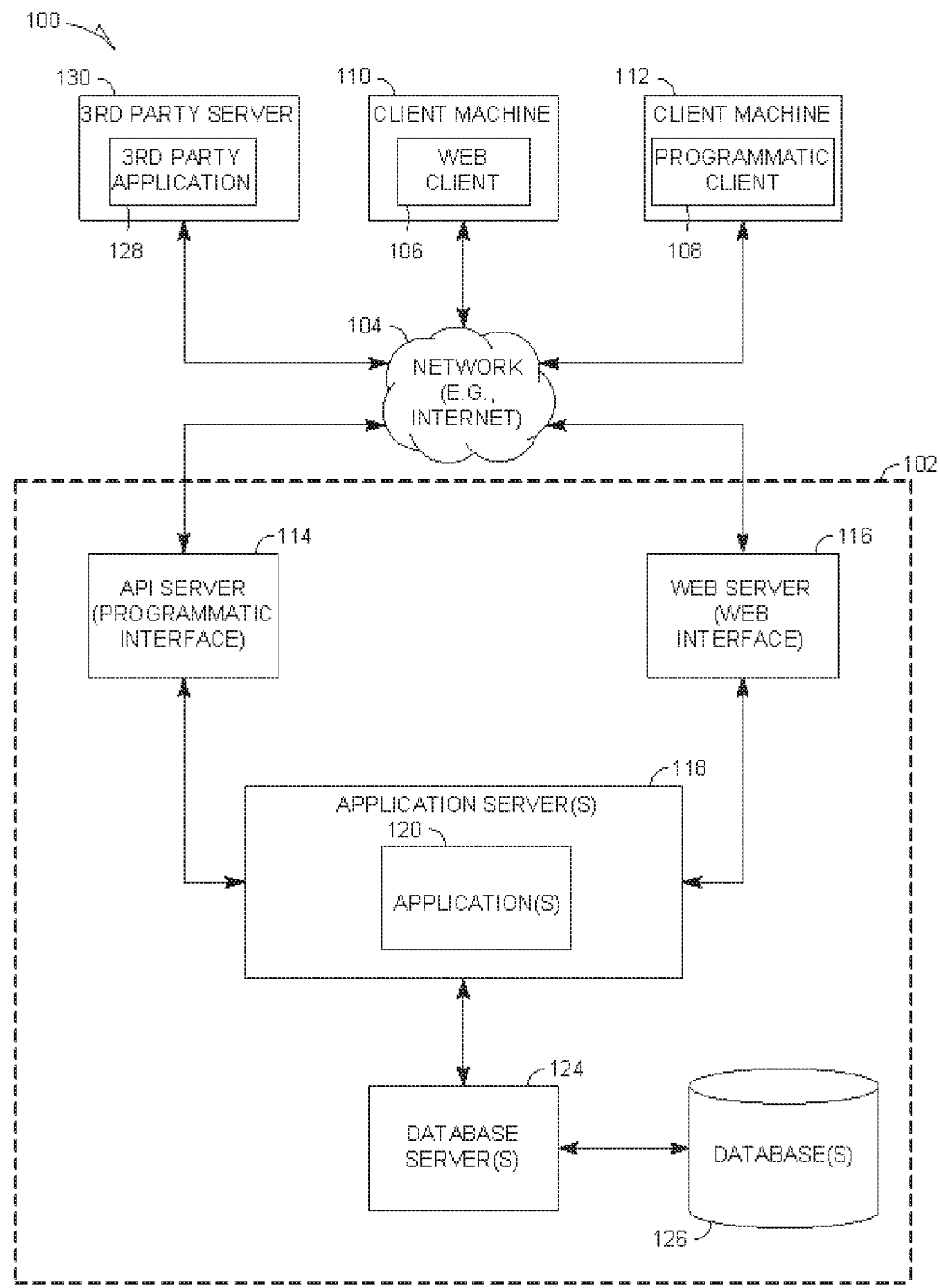
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a heterogeneous network of nodes is formed. A heterogeneous network of nodes is one in which there are a plurality of different node types and a plurality of different edge types. A recommender system then utilizes the heterogeneous network of nodes along with a single calibrated importance-aware machine learned model to recommend different types of entities in an online network (and potentially different types of connections as well) to users of the online network.

DESCRIPTION

The disclosed embodiments provide a method, apparatus, and system for using a single calibrated importance aware machine learned model to recommend connections of multiple different entity types to a user of an online network.

As described briefly above, a heterogeneous network of nodes is a network in which a plurality of different node types and plurality of different edge types are permitted. In this context, a "type" refers to a class of items. In the case of nodes, each "type" may represent a different class of entities such that each class is represented by a data structure having different fields (in contrast with a data structure having the same fields but different values in the fields). Thus, for example, one node type may be "user" or "member," and may define a first set of fields that can be used to fill in information about a user, such as name, title, place of employment, skills, education, and so forth. A second node type may be a "company" or "organization," and may define a second set of fields that can be used to fill in information about an organization, such as industry, location, number of employees, market value, and so forth. A third node type may be a newsletter, and may define a set of fields that can be used to fill in information about the newsletter, such as title, author, topic, genre, and so forth. Other examples of node types include hashtags, groups, and events.

In the case of edges, each "type" may represent a different intention for action between the corresponding edge. Examples of edge types may include connection edges (where a member generally connects to another member, and the intention for action is to permit two-way communication between the members), follow edges (where a member follows a hashtag/company/member, and the intention for action is for the member to be apprised of changes made to hashtag/company/member nodes or related to those nodes), and subscribe edges (where a member subscribes to group/newsletter/event, and the intention for action is for the member to be apprised of updates or new versions of the corresponding nodes).

Each edge may be either bidirectional or unidirectional. Bidirectional edges provide a link between the nodes that operates in both directions (e.g., from node A to node B and from node B to node A). A connection edge is an example of a bidirectional edge, as it works to allow the user corresponding to node A to communicate with the user corresponding to node B and vice-versa). Unidirectional edges provide a link between nodes that only operates in one direction (e.g., from node A to node B but not from node B to node A). Examples of unidirectional edges include subscribe edges and follow edges.

One way to make recommendations to members of various different entities (of potentially different entity types) is to train a separate machine learned model on each different combination of node type and edge type. Thus, for example, there may be a first machine learned model trained for "member" "connection edges," a second machine learned model trained for "member" "follow edges," a third machine learned model trained for "hashtag" "follow edges," and so on. Each of these separately trained machine learned models may be called an Edge-FPR model and essentially rank different entities of their corresponding node type against each other.

The Edge-FPR models are separate and independent artificial intelligence (AI) models that can each leverage their own machine learning algorithm, such as XGBoost, Logistic Regression, Deep Neural Networks, and the like, along with their own domain knowledge, to rank the entities. They may also be optimized for different immediate metrics (e.g., clicks) and might even be generating scores for the entities of the corresponding node types using different scales. This makes it difficult to compare the importance of one entity of a first entity type against a second entity of a second entity type.

Thus, it would be beneficial to have a single machine learned model that allows for ranking of entities across all the different combinations of node types and edge types. One technical challenge in doing so, however, is the aforementioned scale issue—each Edge-FPR model produces scores that can be on different scales. As such, in an example embodiment, a solution is provided that calibrates the scores from the Edge-FPR models to a single scale. Specifically, log-linear regression is utilized over quantiles of scores from Edge-FPR models to calibrate them and make them comparable.

An additional technical challenge is that member engagement is different for the different edge types. The result is that there can be a different training data distribution for each edge, which can result in a bias towards certain edge types (certain edge types having higher importance than other edge types). As such, in an example embodiment, the solution utilizes a per-edge type multiplicative factor dictated by the true importance of an edge type, which is learned through a counterfactual experimentation process.

An additional technical challenge in utilizing a single machine learned model is that each Edge-FPR model may be optimized on a different metric. Thus, in an example embodiment, the solution optimizes on a single, common downstream metric, specifically downstream interactions, that can be compared against each other across all combinations of node types and edge types.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
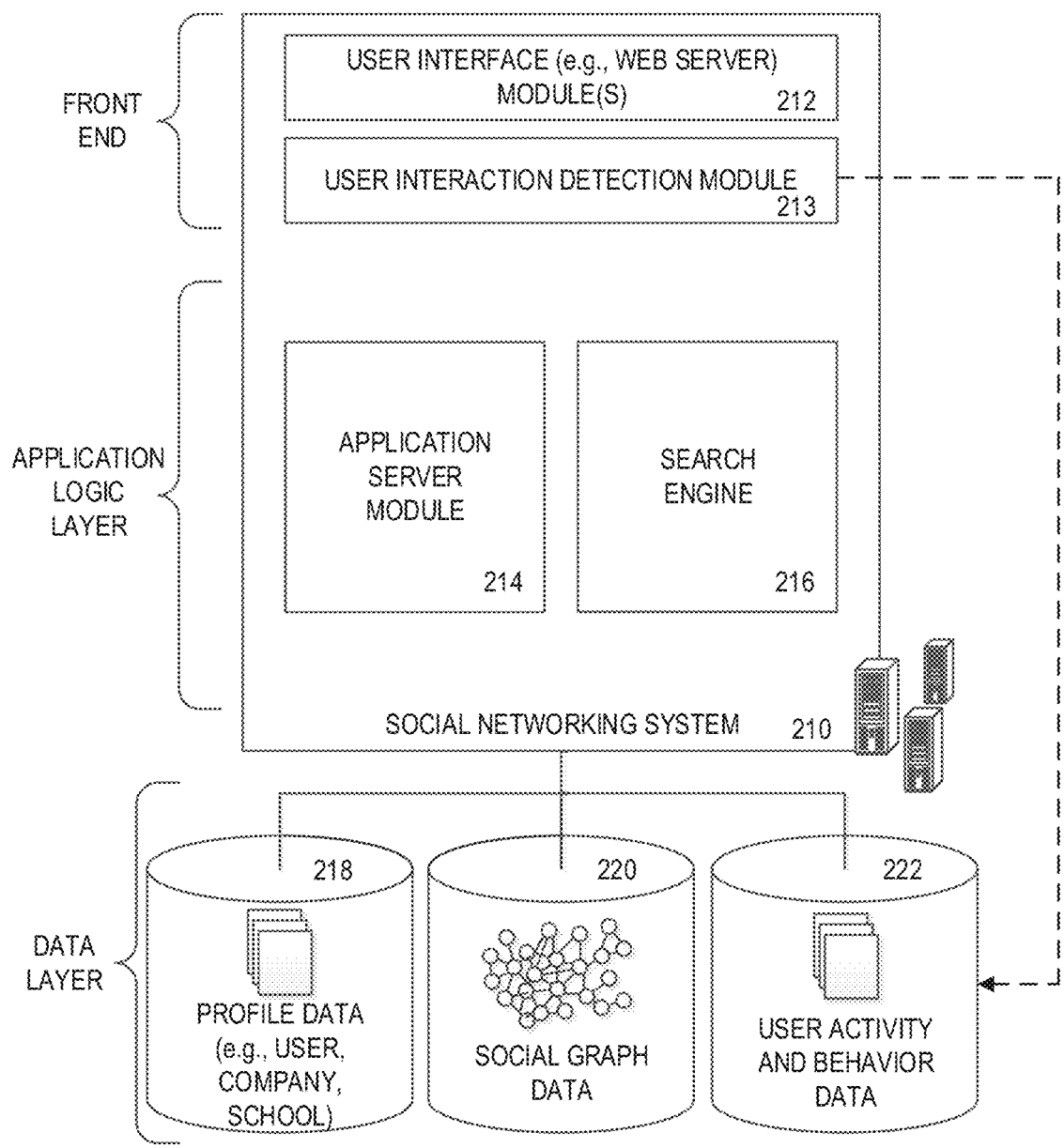
FIG. 2 is a block diagram showing the functional components of an online network, including a data processing module referred to herein as a search engine, for use in generating and providing search results for a search query, consistent with some embodiments of the present disclosure.

In some embodiments, the networked system 102 may comprise functional components of an online network. FIG. 2 is a block diagram showing the functional components of an online network, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online network.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online network, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the online network, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the online network. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online network, nothing other than data privacy concerns prevents the API from being provided to the public or to certain third parties under special arrangements, thereby making the navigation recommendations available to third-party applications 128 and services.

Although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online network, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
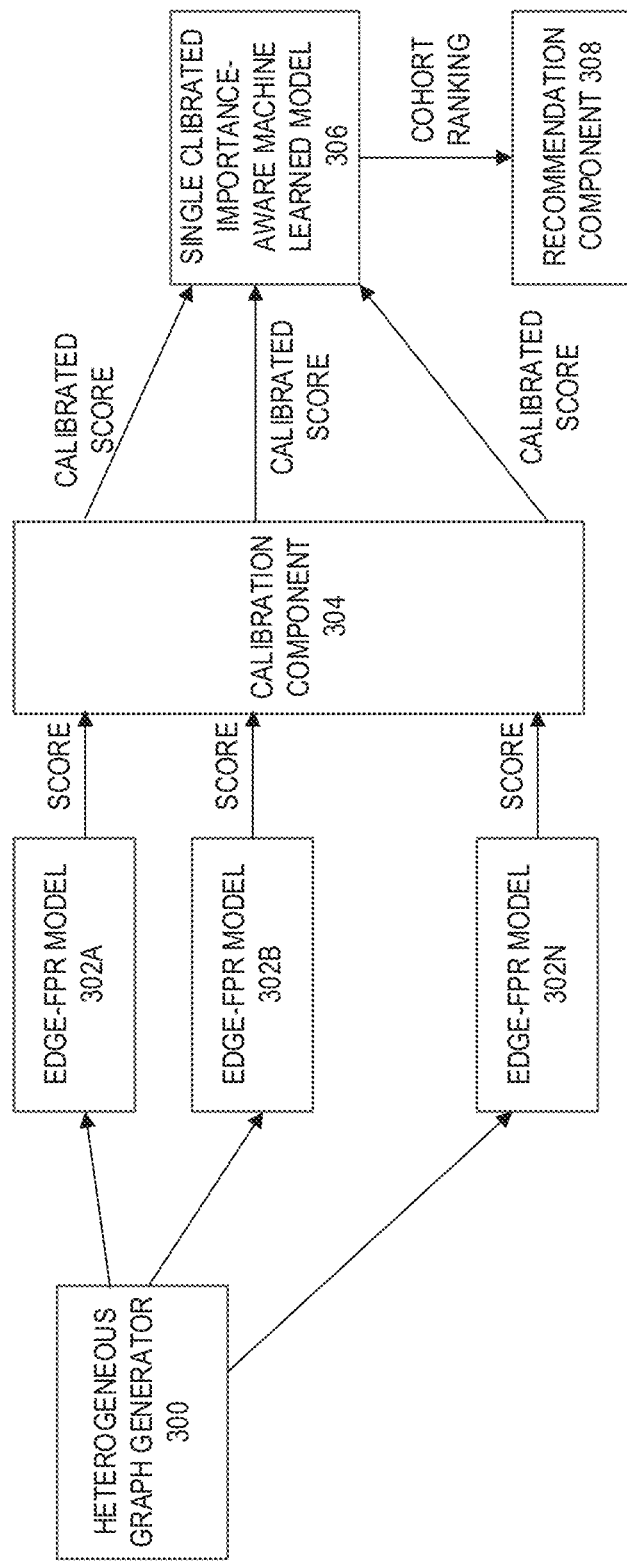
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

A heterogonous graph generator 300 may create a heterogeneous network of nodes from social network information from the databases 218, 220, 222. The process involved in creating the heterogonous network of nodes is beyond the scope of this disclosure, but generally involves taking data structures representing entities of different node types and forming these data structures into nodes of different types, then connecting the nodes via edges of potentially different types based on various types of connections defined between the data structures.

A plurality of different Edge-FPR models 302A-302N (one for each different combination of node type and edge type) may each utilize the heterogeneous network of nodes and an input entity to score each of a plurality of different possible entities of their corresponding entity type. The score is a relative score based on a comparison of each of the plurality of different possible entities of their corresponding entity type against each other, and these scores may be on a different scale and optimized for different things based upon the Edge-FPR model 302A-302N. These scores may represent a likelihood that the input entity would be interested in forming a connection with the corresponding entity from the plurality of different possible entities (that interest being possibly measured based on different metrics based on the Edge-FPR model in question).

Each of the Edge FPR models 302A-302N may be trained by a machine learning algorithm (potentially different machine learning algorithm) to make their predictions. This training may include specifying an optimization parameter, such as a metric like downstream interaction by users within a first time period (e.g., thirty days) and then feeding training data, which may include sample entities and sample users and their corresponding interactions to the corresponding machine learning algorithm. The machine learning algorithm then progressively learns weights to be applied to each of a plurality of different features associated with the sample users and the sample entities. These weights can then be applied to values of features of users and entities at evaluation time in order to produce the predictions.

The input entity is simply an entity in the heterogeneous network of nodes that is being evaluated. This may occur when, for example, the input entity logs into the online network and navigates to a page or portion of the graphical user interface where recommendations of entities are to be displayed. Examples of such graphical user interfaces will be provided in more detail below.

A calibration component 304 then takes each of the individual scores produced by the Edge-FPR models 302A-302N and calibrates them based on their corresponding Edge-FPR models. As will be described in more detail below, calibration itself is performed by a machine learned model, different than the machine learned models that comprise the Edge-FPR models 302A-302N.

The output of the calibration component 304 is then calibrated scores. These calibrated scores may then be utilized by a single calibrated importance-aware machine learned model 306 that is trained to utilize the calibrated scores, and information about the corresponding entity types, to produce a downstream interaction score for each of the plurality of entities of the different entity types. This downstream interaction score is then used by a recommendation component 308 to make one or more recommendations for the input entity. This may include displaying the one or more recommendations via a graphical user interface displayed on a display of a device operated by the input entity.

In an example embodiment, the single calibrated importance-aware machine learned model 306 predicts the probability of downstream interaction from top-k entities within a cohort and then ranks the cohorts using this probability score. A cohort may be defined as a combination of a node type (entity type) and edge type (connection type). Thus, a first cohort is a first combination of a node type and an entity type while a second cohort would be a different combination of a node type and an entity type. For example, the following are three different cohorts: (1) User A/connection edge type; (2) User A/follow edge type; (3) User B/follow edge type. In an example embodiment, the single calibrated importance-aware machine learned model 306 is a logistic regression model. The model equation may be as follows:

For a member i, let $y_{ic}$ be 1 if the member interacts (likes, comments, shares) with any of the top-k entities from a cohort c, otherwise 0. Then our model equation is:

$$P(y_{ic} = 1 \mid c \text{ was shown to } i, \theta) = \sum_{Edge} \theta_{Edge} \Gamma(f_{Edge}(e_{ij}^{Edge})) + \sum_{k} \theta_k x_{ic}^k$$

In the above equation, $f_{Edge}$ represents a calibration function learned for the corresponding cohort by the calibration component 304. $\Gamma$ is an aggregation function that takes the Edge-FPR scores $e_{ij}^{Edge}$ for the entities j in cohort c and aggregates them to generate a score at the cohort level. Basically, $\Gamma$ is an aggregation function that converts entity-level Edge-FPR scores to cohort level scores. Cohort-level means that the cohort itself is scored, as opposed to the individual entity within the cohort. $x_{ic}^k$ are additional features, such as type of cohort, intent of member i, and so forth. $\theta = \{\theta_{Edge}, \theta_k\}$ are the unknown parameters to be estimated.

Overall, the above model equation utilizes aggregated and calibrated Edge-FPR scores as features in addition to other member/cohort features for estimating the probability of downstream interactions of member i on any top-k entity from cohort c. In an example embodiment, the aggregation function $\Gamma$ is a linear aggregation function such as weighted average. Here, if $e_{ij}$ is the score for an item j in cohort c, then the mean aggregation function $\Gamma$ is given by $$\frac{1}{J} \sum_i e_{ij}.$$

In other example embodiments, more complicated, nonlinear aggregation functions may be utilized.

After scoring the cohort c using the above equation, in an example embodiment, this cohort-level score may be multiplied by an importance factor for the cohort. The cohorts are then ranked using these multiplied scores.

Member behavior varies with different edge types. Members like to connect to people but there are only so many people a member knows. On the other hand, a member can follow a lot of hashtags to consume content related to the hashtag. Consequently, this may lead to overrepresentation of follows edges training data used to train the above model equation, and thus may result in disproportionally higher scores for follows edges over, for example, connection edges.

In order to address this technical issue, an importance value of a particular edge type may be estimated by running counterfactual experiments. Specifically, certain edge types are dropped from a member's heterogeneous network and the impact to engagement of the member is measured. The result is a measurement of how important those edge types are, over many members. This measurement is exactly the importance factor mentioned earlier for a cohort, which is used to multiply by the cohort-level score.

Calibration performed by the calibration component 304 may be performed by a machine learned function mapping from quantiles of edge-FPR scores to a quantized observed response. Edge-FPR models use the observed number of downstream interaction (in some form) as the response for training their models. A click, like, comment, or share are examples of such downstream interaction. So for a connection-edge, this would mean that the number of clicks, likes, comments, or shares on the content posted by the connected entity would be the downstream interaction while for a follows-edge, this would mean that the number of clicks, likes, comments, or shares on content related to the hashtag or company followed would be the downstream interaction.

Let s be the score quartiles generated by an Edge-FPR model for an input entity and an item (entity from the plurality of possible entities to recommend). Let z be a response variable for this Edge-FPR, and $f_{edge}$ be the calibration function, which is a calibration mapping function parameterized by a set of unknown parameters $\Phi$, then mathematically:

$$z|\Phi \sim f_{edge}(s)$$

The following equation estimates a mapping function $f_{edge}$ by running a log-linear regression, namely $f_{edge}$, that takes the following form:

$$z|\phi \sim g^{-1}(w_1 s^0 + w_2 s^1 + w_3 s^2 + w_4 s^3 + w_5 \log(1+s) + w_6 (1+s)^{-1})$$

where:
z is Edge-FPR model's response (for example, number of likes by a viewer on an item),
g is the log link function,
$\phi = \{w_1, w_2, w_3, w_4, w_5, w_6\}$ is the set of unknown weights to be estimated,
s is the score quartile for viewer and cohort, and $$s^0, s^1, s^2, s^3, \log(1+s), \frac{1}{(1+s)}$$

are the transformations of s used as regressors.

In an example embodiment, a common downstream metric is used as the common baseline to evaluate the different edge types. This is important as it helps ensure that the system is moving towards the eventual goal of optimizing members' engagement and helps define the objective of the single model. In an example embodiment, this common downstream metric is active edges. An active edge is defined as a viral interaction, such as a like, comment, or share within 7 days of edge creation for an entity. For connection edge types, this definition is expanded to include communication, such as private messages. Notably, this interaction time period (7 days) is different than the 30 day time period used by one or more of the Edge FPR models.

Figure 4:
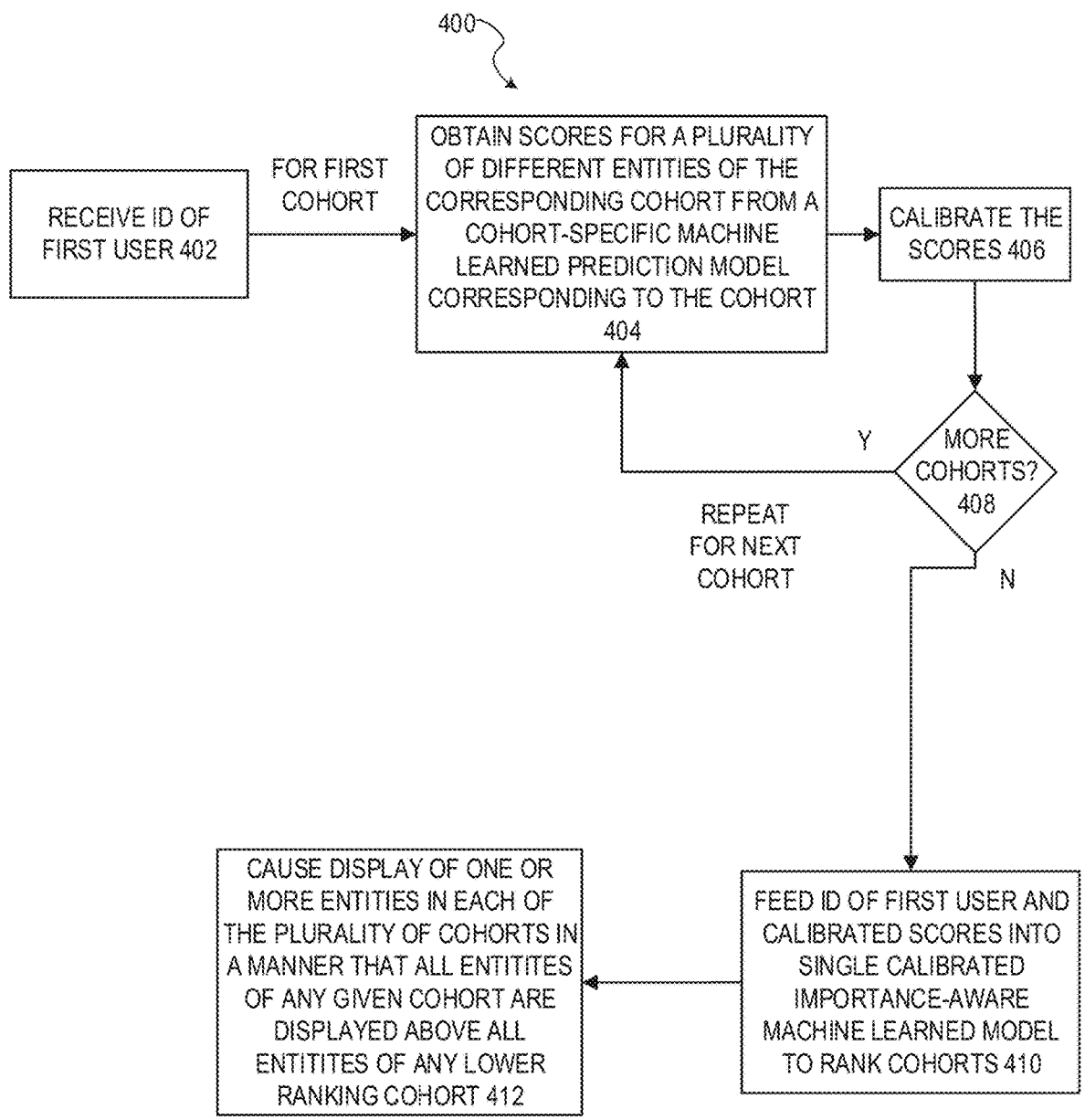
FIG. 4 is a flow diagram illustrating a method for utilizing a plurality of machine-learned models, in accordance with an example embodiment.

FIG. 4 is a flow diagram illustrating a method 400 for utilizing a plurality of machine-learned models, in accordance with an example embodiment. At operation 402, an identification of a first user of an online network is received. Then, a loop is performed for each of a plurality of different cohorts in an online network. As described above, a cohort is a unique combination of a type of entity (e.g., user, organization, hashtag, event, etc.) and type of connection (e.g., regular connection, such as between users, follow connection, subscribe connection) within the online network. At operation 404, scores for a plurality of different entities of the corresponding cohort are obtained from a cohort-specific machine learned prediction model corresponding to the cohort. These scores are on a scale corresponding to the cohort and are indicative of the likelihood that the first user will interact with each of the plurality of different entities. It should be noted that, for purposes of this disclosure, interacting with an entity involves an action taken within a graphical user interface to interact with some aspect of the entity and can include interacting with content posted by the entity or content posted about the entity, and should not be limited to directly interacting with the entity itself. In an example embodiment, this likelihood is specifically the likelihood that the first user will interact with each of the plurality of different entities within a first time period.

At operation 406, the scores for the plurality of different entities are calibrated onto a common scale. The common scale is a scale that will be used for multiple cohort-specific machine learned prediction models, rather than just a single cohort-specific machine learned prediction model. At operation 408, it is determined whether there are any more cohorts to examine. If so, then the method 400 loops back to operation 404 for the next cohort. If not, then at operation 410, the identification of a first user and the calibrated scores from the plurality of different cohort-specific machine learned prediction models are fed into a single calibrated importance-aware machine learned model trained to predict a probability of downstream interaction by users, via a graphical user interface, with top-k entities within each of a first plurality of cohorts and ranking the plurality of cohorts, thus resulting in the first cohort and the second cohort being ranked for the first user. At operation 412, one or more entities of each of the plurality of cohorts is displayed, in the graphical user interface, to the first user, in a manner that all entities of any given cohort are displayed above all entities of any lower ranking cohort.

Figure 5:
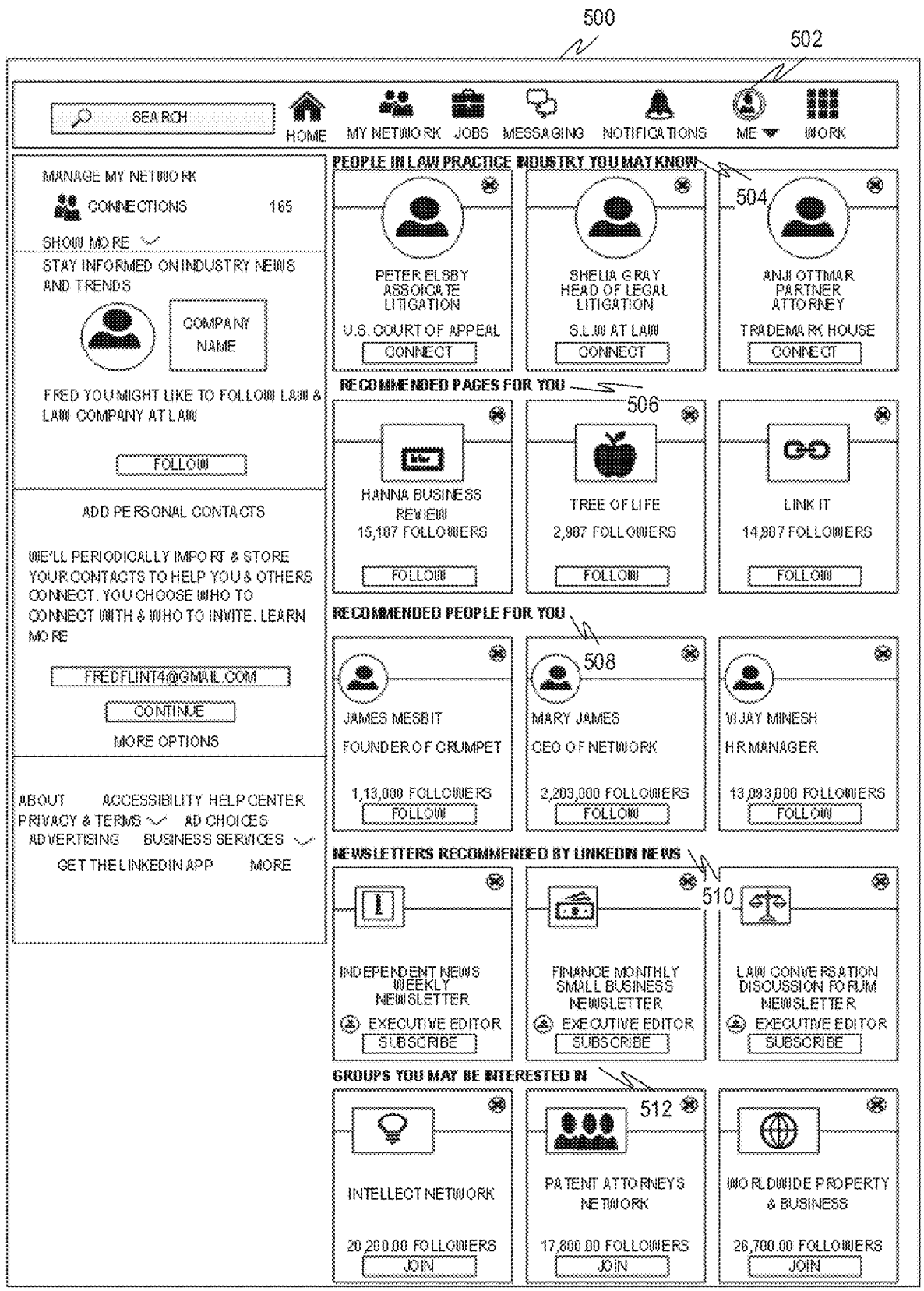
FIG. 5 is a block diagram illustrating a screen capture of a graphical user interface, in accordance with an example embodiment.

FIG. 5 is a block diagram illustrating a screen capture of a graphical user interface 500, in accordance with an example embodiment. This diagram illustrates an example output of operation 412 of FIG. 4. Specifically, there are four cohorts of entities depicted as recommended connections for a first user 502. These cohorts include people (for connection) 504, organizations 506, people (for follow) 508, newsletters 510, and groups 512. Notably, all of the recommendations for people (for connection) are displayed above all of the recommendations for organizations, as well as above the other cohorts. This indicates that the single calibrated importance-aware machine learned model has ranked the people (for connection) cohort higher than the organization cohort and all the other cohorts for the first user 502.

Figure 6:
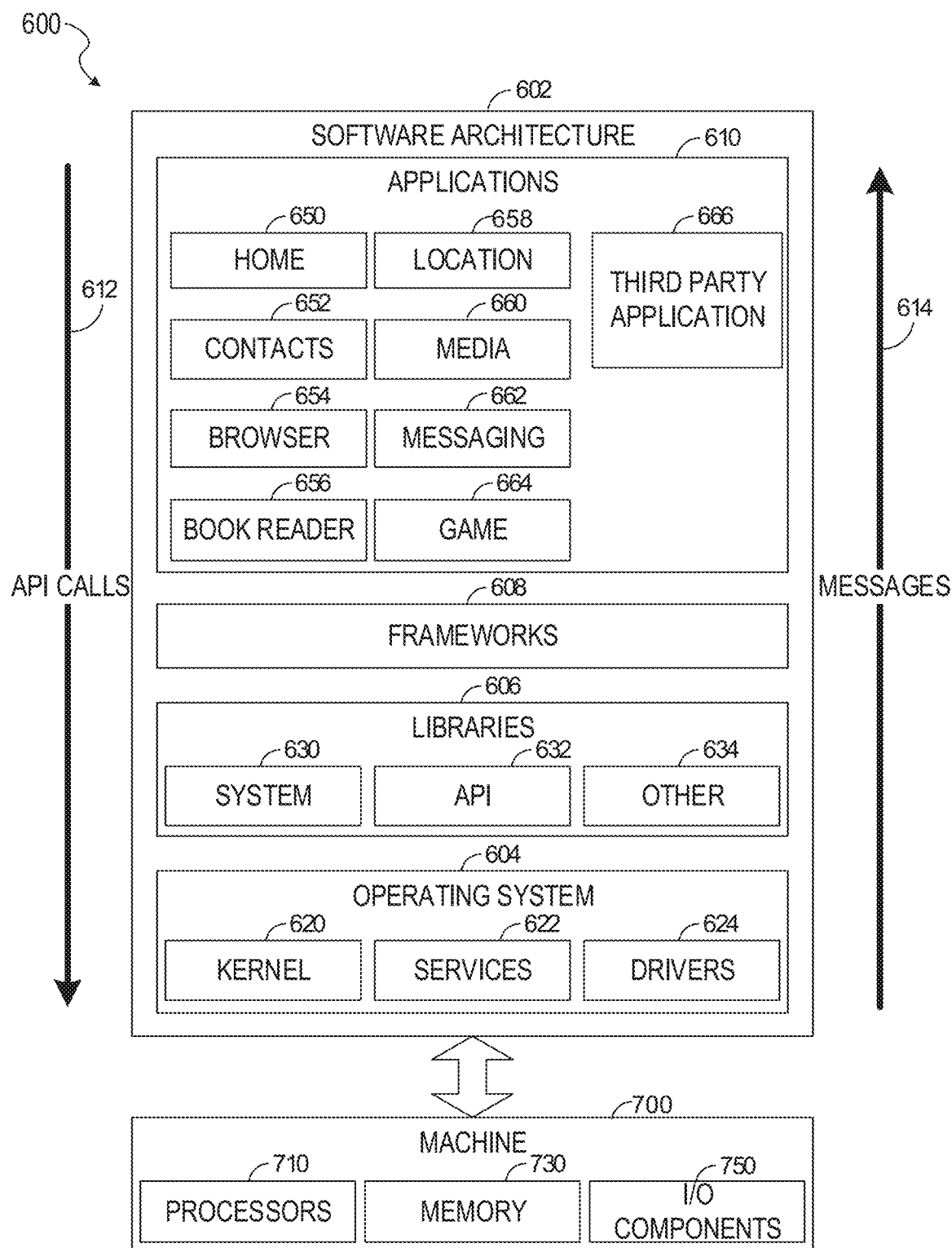
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
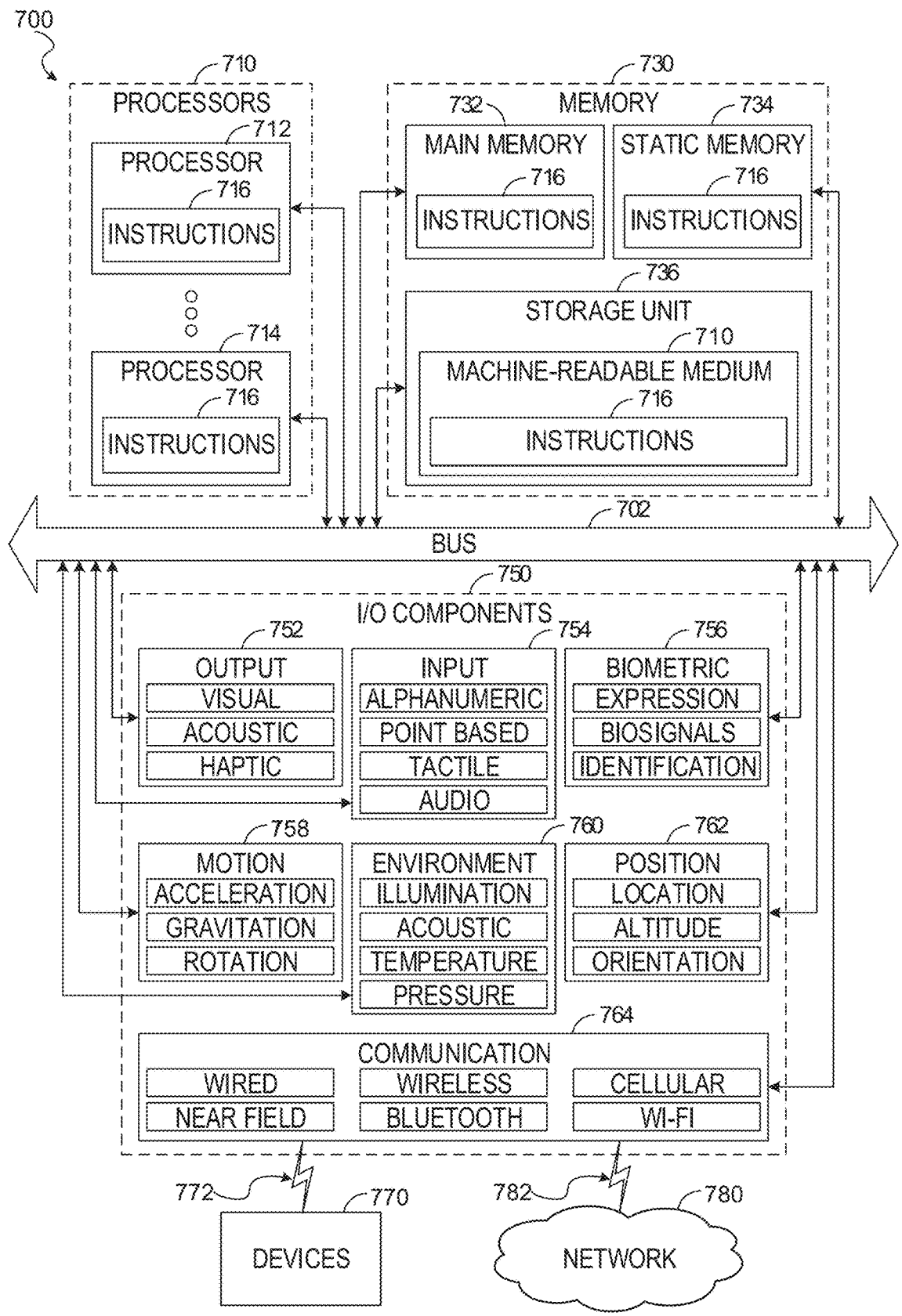
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 400 of FIG. 4. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a non-transitory computer-readable medium having instructions stored thereon, which, when executed by a processor, cause the system to perform operations comprising:
training a first cohort-specific machine learned prediction model corresponding to a first cohort by specifying a first optimization parameter and then feeding first training data and the first optimization parameter into a first machine learning algorithm, the first training data including sample entities of a first type of entity in an online network and sample entries of a first type of connection between entities in the online network;
receiving an identification of a first user in an online network;
obtaining, from the first cohort-specific machine learned prediction model, first scores for a plurality of different entities of the first cohort based on the identification of the first user, the first scores indicative of a likelihood of the first user interacting with each of the plurality of different entities of the first cohort via a graphical user interface of the online network, wherein the first cohort is a first combination of the first type of entity in an online network and the first type of connection between entities in the online network, the first cohort-specific machine learned prediction model calculating first scores on a first scale;
calibrating the first scores onto a common scale utilized by multiple cohort-specific machine learned prediction models;
obtaining, from a second cohort-specific machine learned prediction model corresponding to a second cohort based on the identification of the first user, second scores for a plurality of different entities of the second cohort, the second scores indicative of a likelihood of the first user interacting with each of the plurality of different entities of the second cohort via a graphical user interface of the online network, wherein the second cohort is a second combination of the first type of entity in the online network and a second type of connection between entities in the online network, the second cohort-specific machine learned prediction model calculating the second scores on a second scale, wherein the second cohort-specific machine learned prediction model is trained separately from the first cohort-specific machine learned prediction model;
calibrating the second scores onto the common scale;
feeding the identification of the first user, the calibrated first scores, and the calibrated second scores into a single calibrated importance-aware machine learned model trained to predict a probability of downstream interaction by users with top-k entities within each of a plurality of cohorts to obtain a ranking of the plurality of cohorts for the first user; and
causing display, in the graphical user interface, to the first user, of one or more entities of the first cohort and one or more entities of the second cohort in a manner that entities of a higher ranking cohort are displayed above entities of a lower ranking cohort.

2. The system of claim 1, wherein the first cohort-specific machine learned prediction model is a neural network.

3. The system of claim 1, wherein the single calibrated importance-aware machine learned model converts entity-level scores to cohort-level scores using an aggregation function.

4. The system of claim 3, wherein the aggregation function is a weighted average.

5. The system of claim 3, wherein the aggregation function is a non-linear aggregation function.

6. The system of claim 3, wherein each cohort-level score is multiplied by a different importance factor unique to the corresponding cohort, wherein the importance factor for each cohort is estimated by dropping edges corresponding to the corresponding cohort from member heterogonous graphs of entities in training data and measuring impact to the downstream interaction of members.

7. The system of claim 1, wherein the calibrating is performed by machine learned function mapping from quantiles of scores from cohort-specific machine learned models to a quantized observed response.

8. The system of claim 7, wherein the quantized observed response is a click, like, comment, or share action in a graphical user interface.

9. The system of claim 1, wherein the operations further comprise:
training the second cohort-specific machine learned prediction model by specificizing a second optimization parameter and then feeding second training data and the second optimization parameter into a second machine learning algorithm different than the first machine learning algorithm, the second training data including sample entities of the first type of entity and sample entries of the second type of connection.

10. The system of claim 1, wherein the operations further comprise:
dynamically adjusting how the one or more entities of the first cohort and the one or more entities of the second cohort are displayed in the graphical user interface in response to a second execution of the obtaining from a second cohort-specific machine learned prediction model corresponding to a second cohort, scores for a plurality of different entities of the second cohort.

11. A computerized method comprising:
training a first cohort-specific machine learned prediction model corresponding to a first cohort by specifying a first optimization parameter and then feeding first training data and the first optimization parameter into a first machine learning algorithm, the first training data including sample entities of a first type of entity in an online network and sample entries of a first type of connection between entities in the online network;
receiving an identification of a first user in an online network;
obtaining, from the first cohort-specific machine learned prediction model, first scores for a plurality of different entities of the first cohort based on the identification of the first user, the first scores indicative of a likelihood of the first user interacting with each of the plurality of different entities of the first cohort via a graphical user interface of the online network, wherein the first cohort is a first combination of the first type of entity in an online network and the first type of connection between entities in the online network, the first cohort-specific machine learned prediction model calculating first scores on a first scale;
calibrating the first scores onto a common scale utilized by multiple cohort-specific machine learned prediction models;
obtaining, from a second cohort-specific machine learned prediction model corresponding to a second cohort based on the identification of the first user, second scores for a plurality of different entities of the second cohort, the second scores indicative of a likelihood of the first user interacting with each of the plurality of different entities of the second cohort via a graphical user interface of the online network, wherein the second cohort is a second combination of the first type of entity in the online network and a second type of connection between entities in the online network, the second cohort-specific machine learned prediction model calculating the second scores on a second scale, wherein the second cohort-specific machine learned prediction model is trained separately from the first cohort-specific machine learned prediction model;
calibrating the second scores onto the common scale;
feeding the identification of the first user, the calibrated first scores, and the calibrated second scores into a single calibrated importance-aware machine learned model trained to predict a probability of downstream interaction by users with top-k entities within each of a plurality of cohorts to obtain a ranking of the plurality of cohorts for the first user; and
causing display, in the graphical user interface, to the first user, of one or more entities of the first cohort and one or more entities of the second cohort in a manner that entities of a higher ranking cohort are displayed above entities of a lower ranking cohort.

12. The method of claim 11, wherein the first cohort-specific machine learned prediction model is a neural network.

13. The method of claim 11, wherein the single calibrated importance-aware machine learned model converts entity-level scores to cohort-level scores using an aggregation function.

14. The method of claim 13, wherein the aggregation function is a weighted average.

15. The method of claim 13, wherein the aggregation function is a non-linear aggregation function.

16. The method of claim 13, wherein each cohort-level score is multiplied by a different importance factor unique to the corresponding cohort, wherein the importance factor for each cohort is estimated by dropping edges corresponding to the corresponding cohort from member heterogonous graphs of entities in training data and measuring impact to the downstream interaction of members.

17. The method of claim 11, wherein the calibrating is performed by machine learned function mapping from quantiles of scores from cohort-specific machine learned models to a quantized observed response.

18. The method of claim 17, wherein the quantized observed response is a click, like, comment, or share action in a graphical user interface.

19. A non-transitory machine-readable storage medium comprising instructions which, when implemented by one or more machines, cause the one or more machines to perform operations comprising:
training a first cohort-specific machine learned prediction model corresponding to a first cohort by specifying a first optimization parameter and then feeding first training data and the first optimization parameter into a first machine learning algorithm, the first training data including sample entities of a first type of entity in an online network and sample entries of a first type of connection between entities in the online network;
receiving an identification of a first user in an online network;
obtaining, from the first cohort-specific machine learned prediction model, first scores for a plurality of different entities of the first cohort based on the identification of the first user, the first scores indicative of a likelihood of the first user interacting with each of the plurality of different entities of the first cohort via a graphical user interface of the online network, wherein the first cohort is a first combination of the first type of entity in an online network and the first type of connection between entities in the online network, the first cohort-specific machine learned prediction model calculating first scores on a first scale;

calibrating the first scores onto a common scale utilized by multiple cohort-specific machine learned prediction models;

obtaining, from a second cohort-specific machine learned prediction model corresponding to a second cohort based on the identification of the first user, second scores for a plurality of different entities of the second cohort, the second scores indicative of a likelihood of the first user interacting with each of the plurality of different entities of the second cohort via a graphical user interface of the online network, wherein the second cohort is a second combination of the first type of entity in the online network and a second type of connection between entities in the online network, the second cohort-specific machine learned prediction model calculating the second scores on a second scale, wherein the second cohort-specific machine learned prediction model is trained separately from the first cohort-specific machine learned prediction model;

calibrating the second scores onto the common scale;

feeding the identification of the first user, the calibrated first scores, and the calibrated second scores into a single calibrated importance-aware machine learned model trained to predict a probability of downstream interaction by users with top-k entities within each of a plurality of cohorts to obtain a ranking of the plurality of cohorts for the first user; and causing display, in the graphical user interface, to the first user, of one or more entities of the first cohort and one or more entities of the second cohort in a manner that entities of a higher ranking cohort are displayed above entities of a lower ranking cohort.

20. The non-transitory machine-readable storage medium of claim 19, wherein the first cohort-specific machine learned prediction model is a neural network.

21. The non-transitory machine-readable storage medium of claim 19, wherein the single calibrated importance-aware machine learned model converts entity-level scores to cohort-level scores using an aggregation function.

22. The non-transitory machine-readable storage medium of claim 21, wherein the aggregation function is a weighted average.

* * * * *